(12) United States Patent
Cho

(10) Patent No.: US 11,423,088 B2
(45) Date of Patent: Aug. 23, 2022

(54) COMPONENT MANAGEMENT DEVICE, COMPONENT MANAGEMENT METHOD, AND COMPUTER PROGRAM PRODUCT

(71) Applicants: KABUSHIKI KAISHA TOSHIBA, Minato-ku (JP); TOSHIBA DIGITAL SOLUTIONS CORPORATION, Kawasaki (JP)

(72) Inventor: Kenta Cho, Kawasaki (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 350 days.

(21) Appl. No.: 16/436,145

(22) Filed: Jun. 10, 2019

(65) Prior Publication Data
US 2019/0377760 A1 Dec. 12, 2019

(30) Foreign Application Priority Data
Jun. 11, 2018 (JP) .............................. JP2018-111156

(51) Int. Cl.
*G06F 16/00* (2019.01)
*G06F 16/9032* (2019.01)
(Continued)

(52) U.S. Cl.
CPC ......... *G06F 16/90328* (2019.01); *G06F 8/76* (2013.01); *G06F 16/908* (2019.01); *G06F 16/9038* (2019.01)

(58) Field of Classification Search
CPC .... G06F 3/16; G06F 9/44536; G06F 11/3089; G06F 40/00; G06F 8/34; G06F 8/71;
(Continued)

(56) References Cited

U.S. PATENT DOCUMENTS

| 7,711,674 B2 | 5/2010 | Arthur et al. |
| 7,877,387 B2 | 1/2011 | Hangartner |

(Continued)

FOREIGN PATENT DOCUMENTS

| CN | 104850542 B | * | 1/2019 | ............ G06F 17/20 |
| JP | 2007-128517 | | 5/2007 | |

(Continued)

OTHER PUBLICATIONS

Kanehiro, K. et al., "Server DB and client DB cooperate each other Create Your First AIR-DB App with PHP and ActionScript", Easier, Inc., 2008, 43 pages (with English translation).

(Continued)

*Primary Examiner* — Diedra McQuitery
(74) *Attorney, Agent, or Firm* — Oblon, McClelland, Maier & Neustadt, L.L.P.

(57) ABSTRACT

A component management device according to an embodiment includes a database, a component searching unit, and a component operating unit. In the database, components are registered. Input-output of each component is defined for type of the component. The component searching unit receives input of the names, or the input examples, or the evaluation data of components; searches for the components registered in the database, according to the input; and presents the search result. The component operating unit sends the input from an application, which uses the searched component, to a component and sends the output of the component to the application.

14 Claims, 17 Drawing Sheets

(51) Int. Cl.
*G06F 8/76* (2018.01)
*G06F 16/908* (2019.01)
*G06F 16/9038* (2019.01)

(58) Field of Classification Search
CPC ........ G06F 8/76; G06F 16/433; G06F 16/434; G06F 16/50; G06F 16/60; G06F 16/70; G06F 16/74; G06F 16/7834; G06F 16/903; G06F 16/90328; G06F 16/9038; G06F 16/908; G06F 2212/455; G06F 2212/464
See application file for complete search history.

(56) References Cited

U.S. PATENT DOCUMENTS

| | | | |
|---|---|---|---|
| 8,745,048 B2 | 6/2014 | Hangartner | |
| 10,911,596 B1* | 2/2021 | Do | G10L 17/00 |
| 2004/0189697 A1 | 9/2004 | Fukuoka et al. | |
| 2013/0080584 A1* | 3/2013 | Benson | G06F 16/254 |
| | | | 709/217 |
| 2018/0335989 A1* | 11/2018 | Chang | H04N 1/00854 |

FOREIGN PATENT DOCUMENTS

| | | |
|---|---|---|
| JP | 4155854 B2 | 9/2008 |
| JP | 2008-242811 A | 10/2008 |
| JP | 2010-49397 A | 3/2010 |
| JP | 2010-250386 A | 11/2010 |
| JP | 5247452 B2 | 7/2013 |
| JP | 2017-146887 A | 8/2017 |

OTHER PUBLICATIONS

Ko, C. et al., "Access technique of the service in the mobile environment using the intermediate agent", Nippon Institute of Technology, 8 pages (with unedited computer generated English translation).

Kadowaki, K. et al., "Simple Excel documentation usable right now", 6 pages (with unedited computer generated English translation).

* cited by examiner

FIG.2

| ID | TYPE NAME | INPUT | OUTPUT |
|---|---|---|---|
| 0 | dialogue_agent | {"type": ⋯ | {"type": ⋯ |
| 1 | objects_detection_from_image | {"type": ⋯ | {"type": ⋯ |
| ⋮ | ⋮ | ⋮ | ⋮ |

31

FIG.3 dialogue_agent

INPUT:
```
{
    "type":{
                    "speech": "string",
                    "info": "object"
    }
}
```

OUTPUT:
```
{
    "type":{
                    "response": "string",
                    "extracted_info": "object",
                    "command": "object"
    }
}
``` objects_detection_from_image

INPUT:
```
{
    "type": {
                    "image": "image"
    }
}
```

OUTPUT:
```
{
    "type":{
                    "rect": "rect",
                    "tag": "object"
    },
        "options": {
                    "hasMultipleOutputs": true
    }
}
```

FIG.4

| ID | TYPE ID | COMPONENT ID | APPLICATION ID | QUERY ID | INPUT | OUTPUT |
|---|---|---|---|---|---|---|
| 0 | 3 | n/a | n/a | n/a | ... | ... |
| 1 | 3 | 5 | 18 | 55 | n/a | n/a |
| ... | ... | ... | ... | ... | ... | ... |

FIG.5

| ID | TYPE ID | NAME | EXPLA-NATION | AVER-AGE EVAL-UA-TION | ENDPOINT INFORMA-TION | CHARGE | AV-ERA-GE PROC-ESS-ING TIME | DATE OF UP-DATE | SIMUL-TANEOU-SLY-UTILIZED COMPO-NENTS | SUBSTI-TUTION DESTI-NATION COMPO-NENT |
|---|---|---|---|---|---|---|---|---|---|---|
| 0 | 0 | name_extractor | NAME EX-TRAC-TION AGENT | 4.2 | http://name.io/api/... | 0.02 | 68 | 3/4/2018 | [5,24] | [15] |
| 1 | 0 | intent_analyzer | INTENT ESTIMA-TION AGENT | 2.8 | http://nlp.com/ia/... | 0.05 | 125 | 12/10/2017 | [35,38] | [ ] |
| ⋮ | ⋮ | ⋮ | ⋮ | ⋮ | ⋮ | ⋮ | ⋮ | ⋮ | ⋮ | ⋮ |
| 102 | 1 | object_detector | OBJECT DETEC-TION, TAG DETEC-TION | 3.9 | http://api.od.com/2/... | 0.1 | 244 | 1/15/2018 | [ ] | [105] |
| ⋮ | ⋮ | ⋮ | ⋮ | ⋮ | ⋮ | ⋮ | ⋮ | ⋮ | ⋮ | ⋮ |

FIG.6

| ID | COMPONENT ID | APPLICATION ID | QUERY COUNT |
|---|---|---|---|
| 0 | 2 | 15 | 128 |
| 1 | 8 | 15 | 551 |
| ⋮ | ⋮ | ⋮ | ⋮ |

| ID | COMPONENT USAGE ID | INPUT | OUTPUT | PROCESSING TIME | EVALU-ATION |
|---|---|---|---|---|---|
| 0 | 0 | {"speech": ... | {"dialogue": ... | 63 | 2 |
| 1 | 0 | {"speech": ... | {"dialogue": ... | 65 | 4 |
| ⋮ | ⋮ | ⋮ | ⋮ | ⋮ | ⋮ |

FIG.8

ENTER A SPEECH

ARRANGE A MEETING TOMORROW WITH MR. TANAKA FOR 2 HOURS FROM 15:00

LIST OF COMPONENTS THAT RESPONDED name_extractor: NAME EXTRACTION AGENT ★★★★☆
"IS IT DIRECTED AT MR. TANAKA?"
EXTRACTED INFORMATION: {NAME: TANAKA} intent_analyzer: INTENT ESTIMATION AGENT ★★★☆☆
"IS IT ABOUT ARRANGING A MEETING?"
EXTRACTED INFORMATION: {OBJECTIVE: ARRANGEMENT OF MEETING} time_extractor: DATE-TIME EXTRACTION AGENT ★★★★☆
"2 HOURS FROM 15:00 TOMORROW IMPLIES 15:00 TO 17:00 ON 3/15"
EXTRACTED INFORMATION: {DATE/TIME: 15:00 TO 17:00 ON 3/15} chat_bot: CHAT AGENT ★★☆☆☆
"THANK YOU FOR ATTENDING THE MEETING"

SPEECH

ARRANGE A MEETING TOMORROW WITH MR. TANAKA FOR 2 HOURS FROM 15:00

LIST OF SELECTED COMPONENTS name_extractor: NAME EXTRACTION AGENT ★★★★☆
"IS IT DIRECTED AT MR. TANAKA?"
EXTRACTED INFORMATION: {NAME: TANAKA} time_extractor: DATE-TIME EXTRACTION AGENT ★★★★☆
"2 HOURS FROM 15:00 TOMORROW IMPLIES 15:00 TO 17:00 ON 3/15"
EXTRACTED INFORMATION: {DATE/TIME: 15:00 TO 17:00 ON 3/15}

ALREADY-EXTRACTED INFORMATION
{NAME: TANAKA, DATE/TIME: 15:00 TO 17:00 ON 3/15}

ENTER NEXT SPEECH

CHECK THE SCHEDULE

LIST OF SELECTED COMPONENTS schedule_checker: SCHEDULE CHECKER AGENT ★★★★☆
"FROM 15:00 TO 17:00 ON 3/15, MR. TANAKA'S PLAN IS {SCHEDULE SEARCH}"
COMMAND: {SCHEDULE SEARCH: {NAME: TANAKA, DATE/TIME: 15:00 TO 17:00 ON 3/15}}

If COMMAND RESPONSE: {AVAILABILITY: false}

ENTER A SPEECH TO USER

SCHEDULE IS FULL

If COMMAND RESPONSE: {AVAILABILITY: true}

ENTER NEXT SPEECH

BOOK A MEETING ROOM

ENTER A SPEECH

ARRANGE A MEETING TOMORROW WITH MR. TANAKA FOR 2 HOURS FROM 15:00

LIST OF COMPONENTS THAT RESPONDED    SELECTION name_extractor: NAME EXTRACTION AGENT ★★★★☆
"IS IT DIRECTED AT MR. TANAKA?"
EXTRACTED INFORMATION: {NAME: TANAKA}    ☑ intent_analyzer: INTENT ESTIMATION AGENT ★★★☆☆
"IS IT ABOUT ARRANGING A MEETING?"
EXTRACTED INFORMATION: {OBJECTIVE: ARRANGEMENT OF MEETING}    ☐ time_extractor: DATE-TIME EXTRACTION AGENT ★★★★☆
"2 HOURS FROM 15:00 TOMORROW IMPLIES 15:00 TO 17:00 ON 3/15"
EXTRACTED INFORMATION: {DATE/TIME: 15:00 TO 17:00 ON 3/15}    ☑ chat_bot: CHAT AGENT ★★☆☆☆
"THANK YOU FOR ATTENDING THE MEETING"    ☐

COMPONENT MANAGEMENT DEVICE, COMPONENT MANAGEMENT METHOD, AND COMPUTER PROGRAM PRODUCT

CROSS-REFERENCE TO RELATED APPLICATIONS

This application is based upon and claims the benefit of priority from Japanese Patent Application No. 2018-111156, filed on Jun. 11, 2018; the entire contents of which are incorporated herein by reference.

FIELD

An embodiment described herein relates generally to a component management device, a component management method, and a computer program product.

BACKGROUND

In recent years, computer systems are used in various fields, and a number of functions have been implemented using applications (software) running in the computer systems. In the development of such applications, if the existing software components (components) are usable, it is expected to achieve a significant reduction in the development cost. In that regard, a mechanism which can appropriately manage applications so as to enable the applications to make use of component groups provided from many and unspecified sources and which can support the use (operations) of the components by the applications is believed to be extremely valuable.

Conventionally, a system is known in which a plurality of components is managed as a library, and in which new components are generated by combining the components and the newly-generated components are registered in the library; or a system is known that calculates the cost from the total license fee of a plurality of items. However, as explained above, a mechanism that appropriately manages component groups provided from many and unspecified sources and that supports the operations of those component groups is not known to exist, and there is a demand to build such a mechanism.

BRIEF DESCRIPTION OF THE DRAWINGS

FIG. 2 is a diagram illustrating an example of a component type database (DB);

FIG. 3 is a diagram illustrating an example of the input and the output defined on a type-by-type basis in the component type DB;

FIG. 4 is a diagram illustrating an example of an evaluation data DB;

FIG. 5 is a diagram illustrating an example of a component catalog DB;

FIG. 6 is a diagram illustrating an example of a component operation DB;

FIG. 7 is a diagram illustrating an example of a query DB;

FIG. 8 is a diagram illustrating an example of a component search user interface (UI);

FIG. 11 is a diagram illustrating an example of a flow building UI;

FIGS. 12 and 13 are diagrams illustrating an example of screen transition of the flow building UI;

DETAILED DESCRIPTION

A component management device according to an embodiment includes a database, a component searching unit, and a component operating unit. In the database, components are registered. Input-output (input and output) of each component is defined for type of the component. The component searching unit receives input of names of components, or input examples of components, or evaluation data of components; searches for the component in the database according to the input; and presents the search result. The component operating unit sends, to a component, the input from application that makes use of the searched component; and sends the output of the components to the applications.

The embodiment of the component management device, a component management method, and a computer program product is described below in detail with reference to the accompanying drawings. The component management device according to the embodiment builds a component market place for enabling a search for components that, with respect to a specific input (for example, speech, image, voice, or sensor data), can offer a response (for example, speech response, image recognition, character recognition, voice recognition, or data analysis); and enables development of applications using the components. Moreover, the component management device supports the operations of the components by the developed applications, and performs reflection of user evaluation and logging of usage charge, as well as proposes switching to newly-added components.

In the embodiment, a "component" implies a software component capable of performing operations such as speech response, image recognition, character recognition, voice recognition, or data analysis. A component receives, as input, a speech, an image, a voice, or sensor data; and returns as output, a response, a recognition result, or an analysis result corresponding to the input. In the embodiment, a person who develops an application using components is called a "developer", and a person who uses an application is called a "user". Moreover, a person who develops a component is called a "component developer".

As an example, the component management device according to the embodiment can be implemented as a server of a server-client system that uses a network. In that case, the component management device provides, to the developers, a user interface (UI) enabling a search for components used by applications via browser mounted in a client terminal used by the developers. Moreover, the component management device also operates as an application programming interface (API) server for the applications that run using components.

Figure 1:
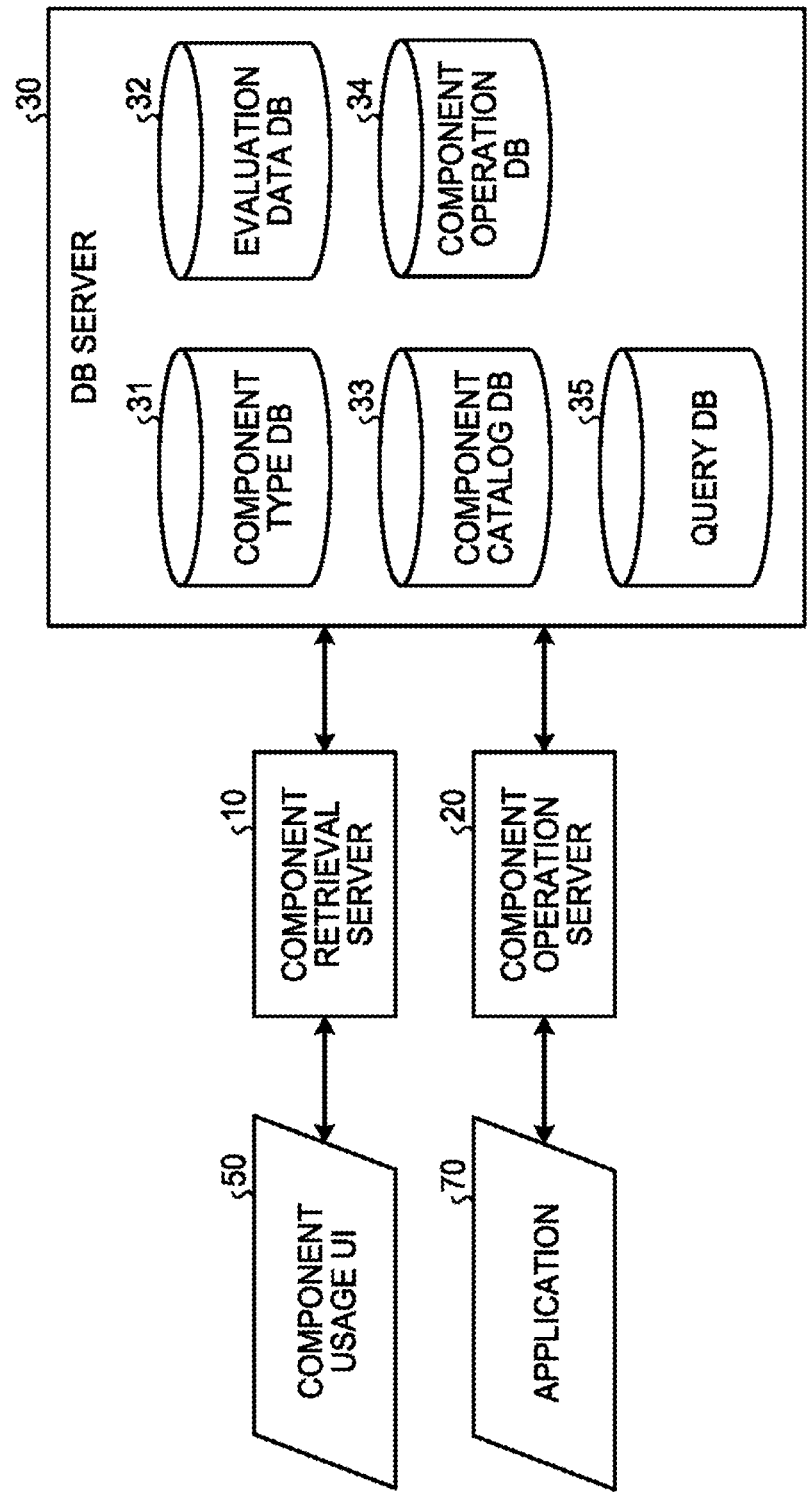
FIG. 1 is a block diagram illustrating an exemplary functional configuration of a component management device.

FIG. 1 is a block diagram illustrating an exemplary functional configuration of the component management device according to the embodiment. As illustrated in FIG. 1, the component management device includes a component retrieval server 10, a component operation server 20, and a database (DB) server 30. For example, the component management device is built as a cloud server (a cloud computing system) that provides services via a network.

The component retrieval server 10 provides, to the developers, a component usage UI 150 that enables searching for the components registered and managed in the DB server 30, and searches for application-usable components via the component usage UI 150.

The component operation server 20 provides an API for enabling an application 70, which runs using components, to use components, and supports the use (operation) of components by the application 70.

The DB server 30 includes a group of databases for managing the information of the registered components. For example, as illustrated in FIG. 1, the DB server 30 includes a component type DB 31, an evaluation data DB 32, a component catalog DB 33, a component operation DB 34, and a query DB 35.

The component type DB 31 is a database for storing the information related to the types of components. FIG. 2 is a diagram illustrating an example of the component type DB 31. As illustrated in FIG. 2, the component type DB 31 is used to store, in a corresponding manner to an ID (a type ID) uniquely assigned to each type of components, the type name of the component type and the information about the input and the output received by the component of the type. Moreover, although not illustrated in FIG. 2, as the information required in implementing a component search UI (described later), the Japanese notation of input names and computer programs for displaying the output result of each component are also stored as information about the component types in the component type DB 31. In the example illustrated in FIG. 2, a "dialogue_agent" type represents a component that provides a dialogue response with a speech serving as the input; and an "object_detection_from_image" type represents a component that performs object recognition with an image serving as the input.

In FIG. 3 illustrates an example of the information about the input and the output as stored in the component type DB 31 illustrated in FIG. 2. The details written in "type" of the input or the output indicate the attribute name and the type of the data that is input or output. The input of the "dialogue_agent" type includes a "speech" attribute in which the speech from a user to a dialogue agent is indicated as a string, and an "info" attribute in which the speech-associated information such as the context of the user is indicated as object type. The output of the "dialogue_agent" type includes a "response" attribute representing the text of the response; an "extracted_info" attribute representing the information extracted from the speech by the component; and a "command" attribute for commanding the application to operate some other system such as an external DB or a business operation system.

The input of the "object_detection_from_image" type includes an "image" attribute indicating the image of the recognition target. The output of the "object_detection_from_image" type includes a "rect" attribute indicating the recognition target rectangular position represented by a rectangle (rect), and includes a "tag" attribute of a recognition target tag represented by an arbitrary object type. Regarding the input-output data, "options" indicating the attribute information can also be specified. In the example illustrated in FIG. 3, as the "options" of the output of the "object_detection_from_image"; "hashMultipleOutput": true is written indicating that there can be a plurality of outputs.

Regarding the input-output, it is also possible to write the information indicating that some attributes are not necessarily mandatory input or output. Meanwhile, an accuracy evaluation logic (described later) for accuracy evaluation of output data can be registered in a corresponding manner to the component type. Such component types can be provided in a fixed manner by the administrator of the component management device; or, in response to the registration of new types of components by component developers, addition of the new component types can be made possible.

The evaluation data DB 32 is a database for storing the information of the evaluation data used in the accuracy evaluation of components. The evaluation data is a combination of the input according to the type of the component (i.e., input data) and the output obtained when the component correctly processes the input (i.e., output data). Thus, when the actual output, which is obtained when the input included in the evaluation data is provided to the component, is compared with the output included in the evaluation data, the accuracy of that component can be evaluated. In the embodiment, besides using the evaluation data registered for each component type by the administrator of the component management device, from among the combinations of the input-output obtained when the applications 70 actually use the components, the combination having the highest evaluation for the output can be used as the evaluation data.

FIG. 4 is a diagram illustrating an example of the evaluation data DB 32. As illustrated in FIG. 4, in the evaluation data DB 32, in a corresponding manner to an ID (evaluation data ID) that is assigned uniquely to each set of evaluation data, a type ID is stored for enabling identification of the type of the component for which the concerned evaluation data is to be used. Moreover, when the evaluation data is used only in the accuracy evaluation of a particular component, an ID (component ID) enabling identification of that component is also stored. Furthermore, if the evaluation data has been registered by the administrator, then the input and the output representing the substance of the evaluation data are also stored. On the other hand, if the evaluation data represents an input-output combination having a high evaluation with respect to the output, then the input and the output representing the substance of the evaluation data is not stored, but an ID (application ID) enabling identification of the application 70 and an ID (query ID) enabling identification of a query corresponding to the input-output are stored. In that case, the input and the output representing the substance of the evaluation data are obtained from the query DB 35 (described later). In the embodiment, an inquiry from the application 70 to a component is called a "query".

The component catalog DB 33 is a database for storing the information of the registered components. FIG. 5 is a diagram illustrating an example of the component catalog DB 33. As illustrated in FIG. 5, in the component catalog DB 33, in a corresponding manner to an ID (component ID) that is uniquely assigned to each registered component, the following information is stored: a type ID enabling identification of the type of the component; the name of the component; the explanation; the average evaluation; the endpoint information; the charge; the average processing time; the date of update; the simultaneously-utilized components; and the substitution destination components.

The name and the explanation of a component are input by, for example, the component developer at the time of registering the component. The average evaluation represents the average value of evaluations (an example of evaluation index) of a component as obtained from the application 70. The endpoint information indicates the storage destination of a component. In the embodiment, the endpoint information is assumed to be a URL for establishing connection to a server on a network, in which the concerned component is stored, using the HTTP REST protocol. However, it is alternatively possible to use some other protocol.

The charge indicates the usage fee (in dollars) of using a component for a single query. The average processing time indicates the average value of the processing time (in milliseconds) taken by the component to process a single query, and represents the response performance of the component. The processing time of a component is the period of time measured since the transmission of the input from the application 70 to the component till the reception of the output from the component. The simultaneous-utilization components indicates component IDs of the other components that are frequently used by the application 70 at the same time of using the concerned component. The substitution destination component is represented by the component ID of the component that frequently serves as the substitution destination for substituting the concerned component using a component substitution mechanism (described later).

The component operation DB 34 is a database for recording the usage history of the use of components by each application 70. FIG. 6 is a diagram illustrating an example of the component operation DB 34. As illustrated in FIG. 6, in the component operation DB 34, in a corresponding manner to an ID (component operation ID) that is uniquely assigned for each unit of usage history collection (i.e., for each combination of a single application 70 and a single component), the following information is stored: a component ID enabling identification of the component; an application ID enabling identification of the application 70; and the query count. The application ID is issued, for example, in response to a request from the developer before the application 70 initially uses a component. The query count indicates the usage count of a component by each application 70, and is updated every time the application 70 uses that component.

The recorded query count is used in billing the usage fee to the developer and making remittance of the charged amount to the component developer. Regarding each component registered in the component operation DB 34, the query count is obtained; the corresponding fees are obtained from the component catalog DB 33 according to the component ID; and the fees are summed to calculate the usage fee for using the component by the applications 70. The billing amount with respect to a developer is calculated by adding the usage fee corresponding to the concerned application ID, and is presented to the developer. The amount payable to a component developer is calculated by adding the usage fee corresponding to the concerned component ID, and is presented to the component developer. Regarding the amount payable to a developer, it is possible to present the amount obtained by subtracting a certain amount as the usage fee for using the component management device.

The query DB 35 is a database for recording the communication of data performed between the applications 70 and the components. FIG. 7 is a diagram illustrating an example of the query DB 35. As illustrated in FIG. 7, in the query DB 35, in a corresponding manner to an ID (query ID) that is uniquely assigned to each query; the following information is stored: a component operation ID enabling identification of the combination of a single application 70 and a single component for which the query is communicated; the actual input and the actual output constituting the query; the processing time; and the evaluation. As described above, the processing time is the period of time measured since the transmission of the input from the application 70 to the component till the reception of the output from the component. The evaluation indicates the extent of successful processing performed by the component, and is represented by values from "1" to "5", for example (the value "5" is assigned when the optimum result is obtained, and the value "1" is assigned when the worst result is obtained). As described above, the evaluation is sent from the application 70 that receives the output of a component. Regarding the same component, the average value of processing times recorded in the query DB 35 is stored as the average processing time in the component catalog DB 33, and the average value of evaluations is stored as the average evaluation in the component catalog DB 33.

Meanwhile, the configuration of the group of databases as described above is only exemplary, and is not limited to that example. Alternatively, for example, some of the databases can be integrated into one, or a single database can be divided into a plurality of databases. Moreover, the information stored in the group of databases is also not limited to the example given above. Alternatively, any other information that is effective in searching for the components or in recording the operational accomplishments can also be stored.

The component retrieval server 10 refers to the component type DB 31 and the component catalog DB 33; and, according to the operations performed by a developer using the component usage UI 150, searches for the components usable by the concerned application 70. The component usage UI 150 includes the following UIs: a UI for specifying the type of components usable by the application 70 and the retrieval style; a UI for requesting a component search according to the specified component type and the retrieval style (a component search UI); a UI for presenting the details of the searched component to the developer (a component details UI); and a UI for building a search for components and a flow sequence in the case in which the application 70 runs by combining plurality of components (a flow building UI).

FIG. 8 is a diagram illustrating an example of a component search UI 50A. Before the component search UI 50A illustrated in FIG. 8 is provided to a developer, the type of components to be searched and the retrieval style is specified by the developer. Examples of the retrieval style include searching with the name of a component, searching with an input example, and searching by providing evaluation data. In FIG. 8 is illustrated an example of the component search UI 50A when the retrieval style of searching with an input example is specified. In the component search UI 50A illustrated in FIG. 8, the "dialogue_agent" type is specified as the type of components to be searched.

The component search UI 50A illustrated in FIG. 8 includes, in the upper portion, an entry field 51 for inputting an input example. In the case of a dialogue agent, when a speech is input as the input example in the entry field 51, the component retrieval server 10 inputs the input example with respect to all components having the corresponding type ID in the component catalog DB 33. Then, the information about the components from which a response (output) is received with respect to the input example (i.e., component information 52) is listed as the search result in the component search UI 50A. As each set of component information 52, for example, a response text (response) and extracted information (extracted_info) that are obtained as the output of a component are displayed. Moreover, the name of the component, the explanation of the component, and the average evaluation (star signs in FIG. 8) are also displayed. Such information is obtained from the component catalog DB 33.

Figure 9:
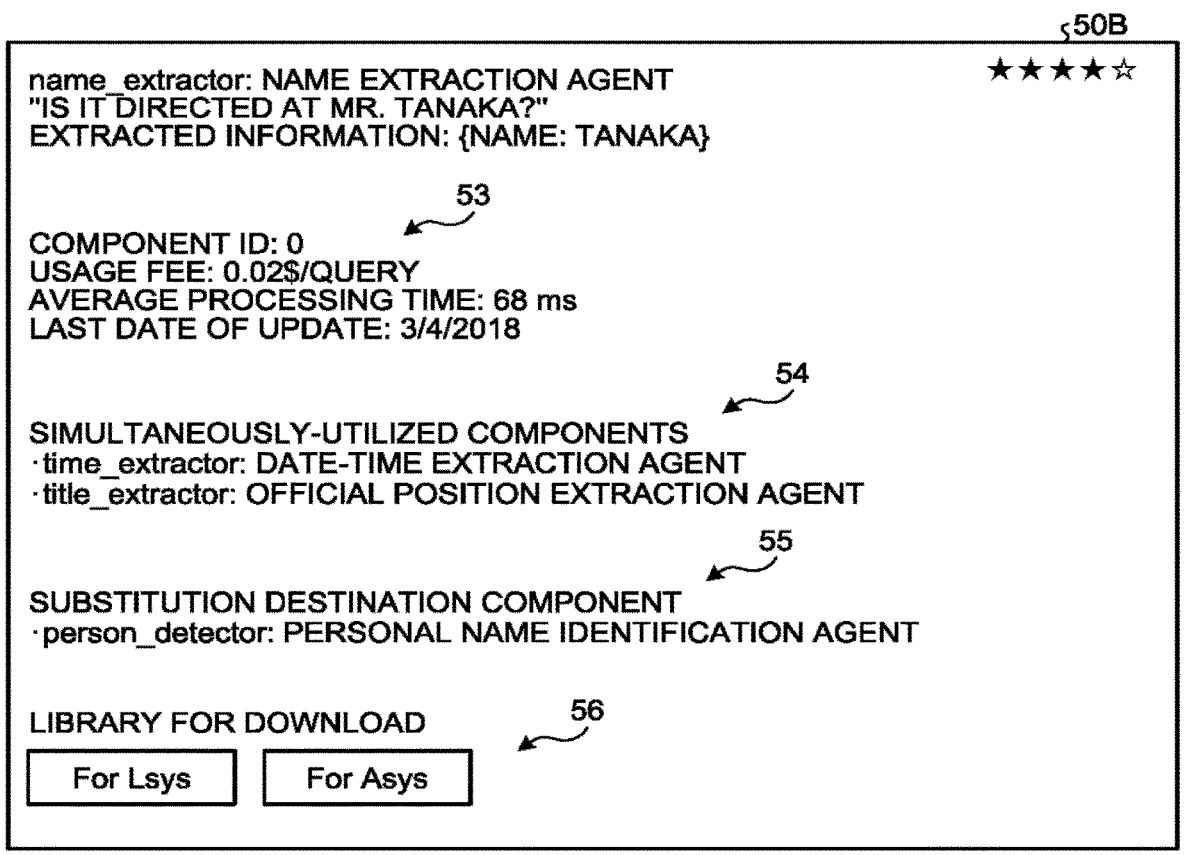
FIG. 9 is a diagram illustrating an example of a component details UI.

FIG. 9 is a diagram illustrating an example of a component details UI 50B that is opened as a result of clicking on the display area of the desired component information 52 from among the sets of component information 52 displayed in the component search UI 50A. The component details UI 50B is a UI for presenting the details of the searched component. The component details UI 50B is built by referring to the component catalog DB 33, and has the following information displayed therein: the information displayed as the component information 52 in the component search UI 50A; and supplementary information 53 containing the component ID of that component, the usage fee, the average processing time, and the last date of update. Moreover, information 54 is displayed that is about the simultaneously-utilized components representing the other components used by the applications 70 (the already-developed other applications 70) that call the concerned component; and information 55 is displayed that is about the substitution destination component evaluated to have a higher accuracy than the concerned component in the component substitution mechanism (described later). Such information is presented as reference information indicating that the application which is using the concerned component is also using particular other components or has substituted with a particular component. Meanwhile, the configuration can be such that, when the display area of the information 54 about the simultaneously-utilized components is clicked or when the display area of the information 55 about the substitution destination component is clicked, it results in the opening of the component details UI 50B corresponding to those components.

From among the components searched in this manner, the developer selects the components to be used in the application 70 and, for example, incorporates the information of the selected components in the source code of the application 70 created in an editor. As a result, it becomes easier to develop the application 70. Meanwhile, if the searched components are assumed to run in a client-edge terminal (described later); then, as illustrated in FIG. 9, the component details UI 50B can include download buttons 56 of libraries running in such specific environment.

Figure 10:
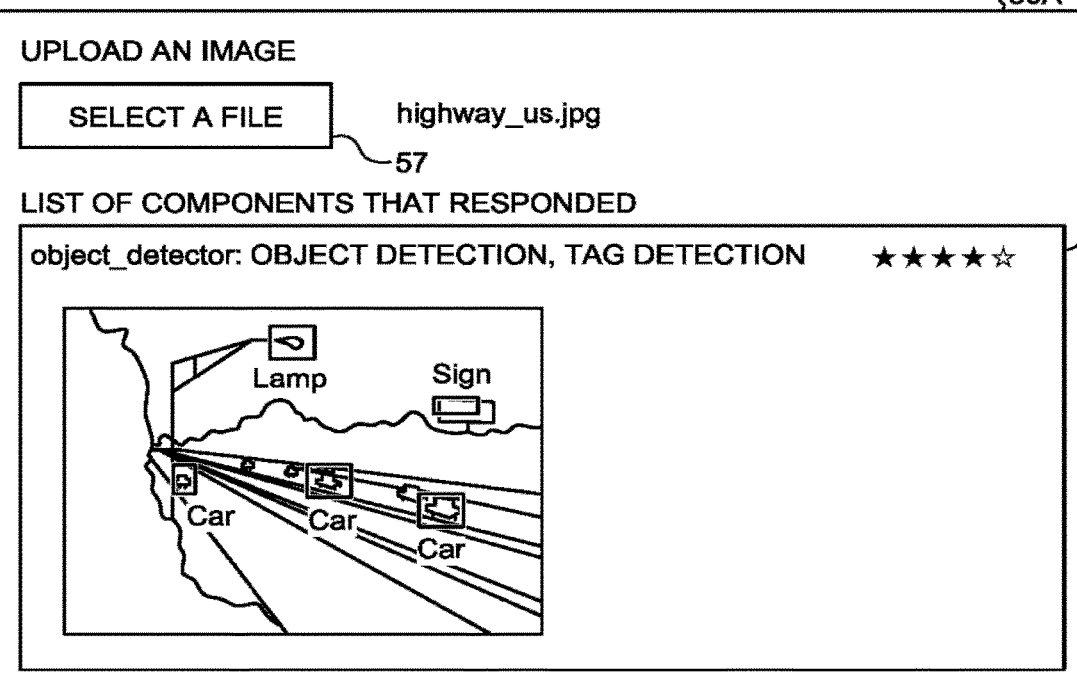
FIG. 10 is a diagram illustrating another example of the component search UI.

Meanwhile, the configuration of the component search UI 50A differs according to the type of components to be searched. FIG. 10 is a diagram illustrating an example of the component search UI 50A in the case in which the object_detection_from_image (image object detection) type is specified as the type of components to be searched. In this example, the input example is input by uploading an image to be recognized, the entry field 51 is replaced by a button 57 that enables selection of an image file to be uploaded. Moreover, in the component information 52 displayed as the search result, in place of the response text (response) and the extracted information (extracted_info), images are included that indicate the recognition result regarding components with respect to the input image.

The explanation given above is about an example in which the retrieval style of searching with an input example is specified. Alternatively, if the retrieval style of searching with the name of a component is specified, then a provision is made for inputting the text of the name of a component in the component search UI 50A. In that case, the component retrieval server 10 searches the component catalog DB 33 while treating the text input in the component search UI 50A as the search condition. Then, from among the components having the corresponding type ID in the component catalog DB 33, the component information 52 of the component whose name includes the text input in the component search UI 50A is displayed as the search result in the component search UI 50A.

Still alternatively, if the retrieval style of searching by providing evaluation data is specified, then a provision is made for uploading the evaluation data in the component search UI 50A. In that case, the component retrieval server 10 sends, to all components having the corresponding type ID specified in the component catalog DB 33, the input data included in the uploaded evaluation data; and calculates the accuracy of each component by comparing the response (output) from that component with the output data included in the evaluation data. Then, as the search result in the component search UI 50A, the sets of component information 52 of the components from which a response is received are listed in a descending order of the calculated accuracies. Regarding the components for which the accuracy does not satisfy a reference value, the corresponding component information 52 may not be displayed.

Meanwhile, the accuracy of a component is calculated using the information in the output definition of the component type DB 31. For example, for a component that outputs "string", the character accuracy rate is used. Moreover, for a component that outputs "object", the coincident property count is used. Furthermore, for a component that outputs "rect", the degree of overlapping of the rectangles is used. Moreover, when an accuracy evaluation logic is registered in the component type DB 31, it is used.

Meanwhile, in the case of developing the application 70 that runs by combining a plurality of components, it becomes necessary to search for the components and to build a flow sequence. In the embodiment, as one of component usage UIs 50, a flow building UI is provided so as to support the application 70 that runs by combining a plurality of components.

FIG. 11 is a diagram illustrating an example of a flow building UI 50C. In FIG. 11 illustrates an example of the flow building UI 50C in the case in which the dialogue_agent (dialogue agent) type is specified as the type of components to be searched and in which the retrieval style of searching with an input example is specified in an identical manner to the example illustrated in FIG. 8. In the flow building UI 50C illustrated in FIG. 11, after the search is performed using the input example in an identical manner to the search performed in the component search UI 50A illustrated in FIG. 8, the application 70 inputs an input example of a speech with respect to the components. At that time, already-extracted information 58 from the previous components is also input. Moreover, regarding simple conditional branching too, such as what processing is to be performed next depending on the response to a demanded command from a component, editing can be performed from the flow building UI 50C using an entry field 59. Meanwhile, the flow that is built in this manner is downloaded in the form of a program code usable in the application 70.

Figure 13:
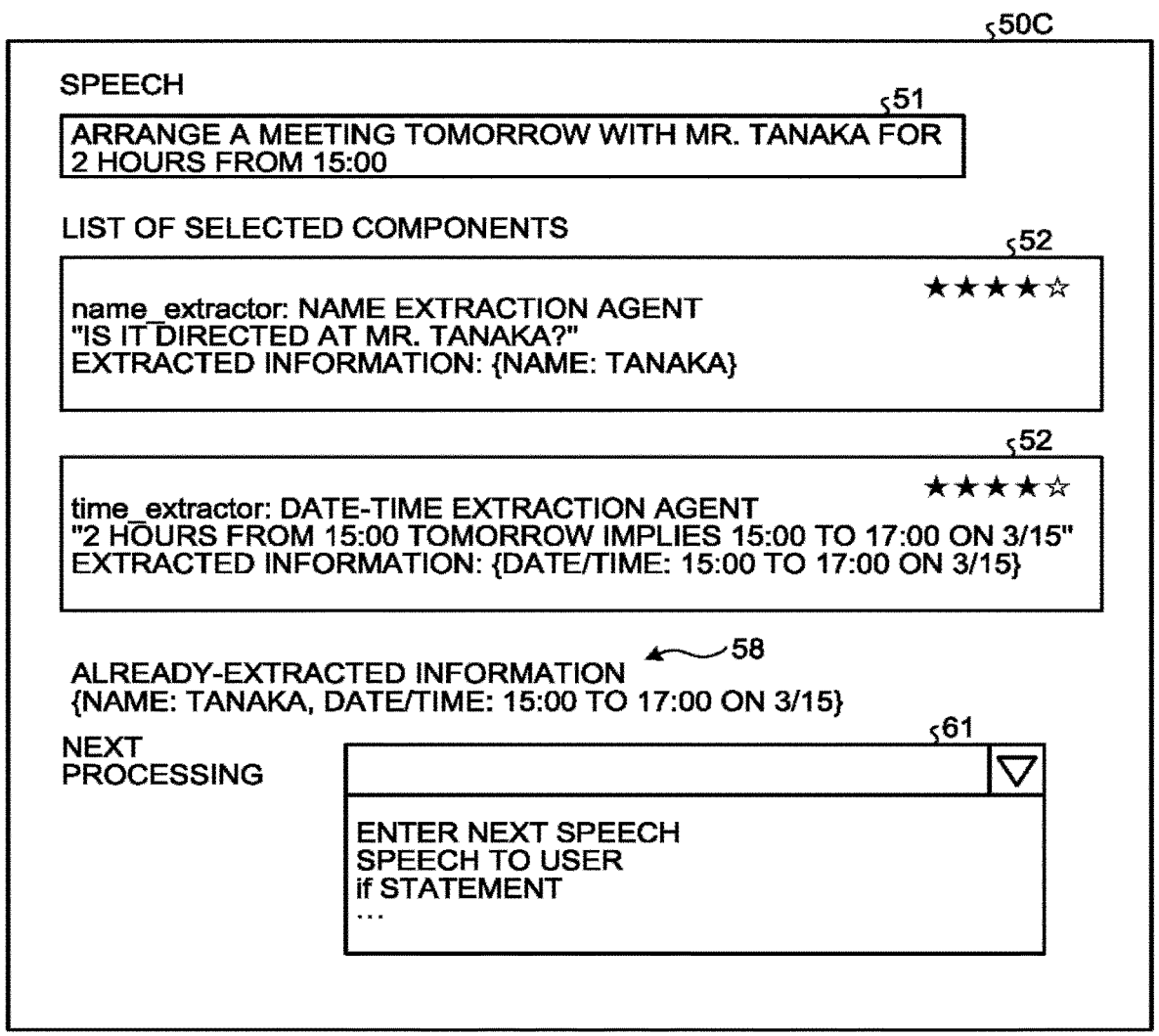

In FIGS. 12 and 13 illustrate an example of screen transition of the flow building UI 50C that is illustrated in FIG. 11 and that is for building the flow sequence. At the time of performing the initial search for components, as illustrated in FIG. 12, in the screen of the flow building UI 50C, the sets of component information 52 are listed as the search result in an identical manner to the component search UI 50A illustrated in FIG. 8; and a checkbox 60 enabling selection of the component is provided corresponding to each displayed set of component information 52. When the developer checks any one checkbox 60 and selects the corresponding component, the flow building UI 50C undergoes transition to the screen for selecting the next processing as illustrated in FIG. 13.

In the screen of the flow building UI 50C illustrated in FIG. 13, the component information 52 of the selected component is displayed along with the already-extracted information 58 indicating the extracted information of the selected component and along with a pulldown list 61 enabling selection of the next processing. When the developer selects the next processing using the pulldown list 61; according to the selected processing, a new provision is made in the screen for the purpose of receiving the necessary operations for the next processing. For example, when "input next speech" or "speech to user" represents the selected processing, a new entry field 51 is added for inputting a speech. Alternatively, when "if statement" represents the selected processing, the entry field 59 is added for inputting a condition. Moreover, a provision can also be made for deleting such processing or substituting with some different processing.

The application 70 that is developed in the manner described above becomes able to use the components, which are registered in the component catalog DB 33, via the APIs provided by the component operation server 20.

The component operation server 20 sends the input from the application 70 to the component identified by the component ID, and sends back the output of that component to the application 70. At that time, the component operation server 20 calculates the processing time as well as performs operations such as obtaining the evaluation of the component from the application 70, recording a new query in the query DB 35, and updating the query count in the component operation DB 34. Moreover, at predetermined timings, the component operation server 20 proposes substitution of the component being used by the application 70 with another component that is newly registered and that provides better performance.

In the embodiment, a registered component is assumed to be software that is installed in a cloud accessible via a network. Alternatively, a registered component can be a library running in a client-edge terminal. In that case, the component catalog DB 33 is used to store the endpoint information as well as the binary of the libraries in the downloadable format. The libraries have a provision for transmitting, to the component operation server 20, the information for updating the component operation DB 34 at the time of using the components. During a search for components performed as described earlier, when a component that includes a library is retrieved, the operable environment of that component can be specified in the component information 52 and displayed in the component search UI 50A. Moreover, as described earlier, the configuration can be such that the download buttons 56 are provided in the component details UI 50B for enabling downloading of the libraries (software components) for running the searched component; and, when the download buttons 56 are pressed, the binary of the libraries is downloaded from the component catalog DB 33.

Explained below with reference to flowcharts illustrated in FIGS. 14 to 19 are the operations performed in the component management device according to the embodiment.

Figure 14:
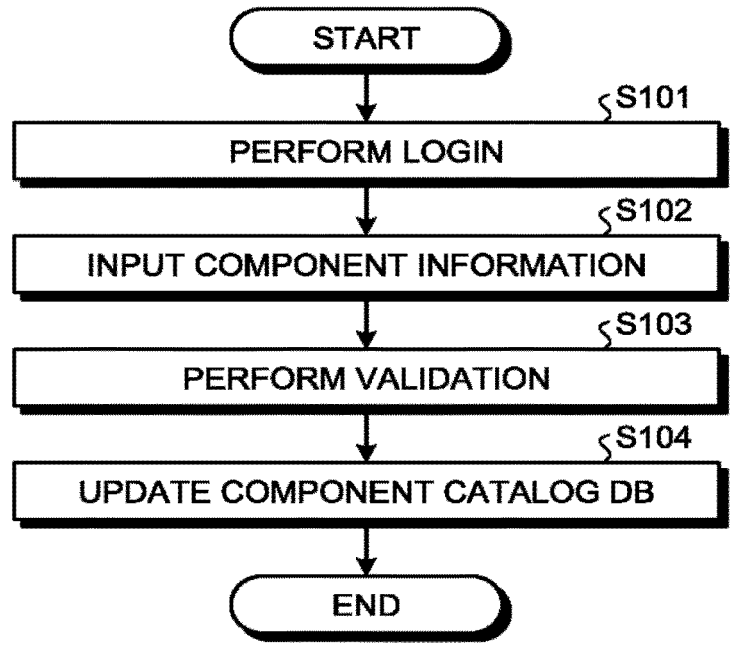
FIG. 14 is a flowchart for explaining an exemplary sequence of operations performed at the time of component registration.

FIG. 14 is a flowchart for explaining an exemplary sequence of operations performed at the time of component registration. A component developer logs in the component management device using his or her own account information (Step S101). Then, the component developer inputs component information, such as the name and the explanation of a component and the endpoint information, that is required at the time of registration in the component catalog DB 33 (Step S102).

The component management device provides evaluation data to the storage destination of the component as identified based on the endpoint information input by the component administrator, and performs validation about whether an appropriate response is received (Step S103). If an appropriate response is received, then the component administrator assigns a component ID and stores the component information, which is input at Step S102, in the component catalog DB 33; and thus updates the component catalog DB 33 (Step S104).

Figure 15:
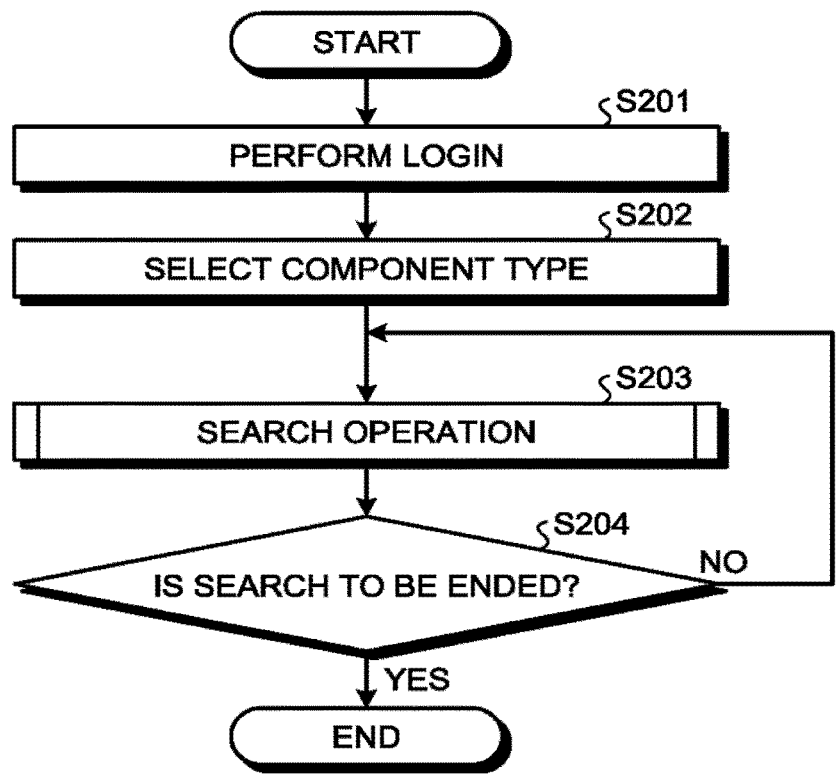
FIG. 15 is a flowchart for explaining an exemplary sequence of operations performed at the time of performing a component search.

FIG. 15 is a flowchart for explaining an exemplary sequence of operations performed at the time of performing a component search. A developer logs in the component management device using his or her own account information (Step S201), and uses the component usage UIs 50 to select the type of components to be searched (Step S202). When the component type is selected, the component retrieval server 10 performs a component search using the component search UI 50A (Step S203). The component search performed by the component retrieval server 10 is continued until an explicit operation to end the search, such as a logout operation, is performed by the developer (No at Step S204). When an explicit operation to end the search is performed (Yes at Step S204), the operations are ended.

Figure 16:
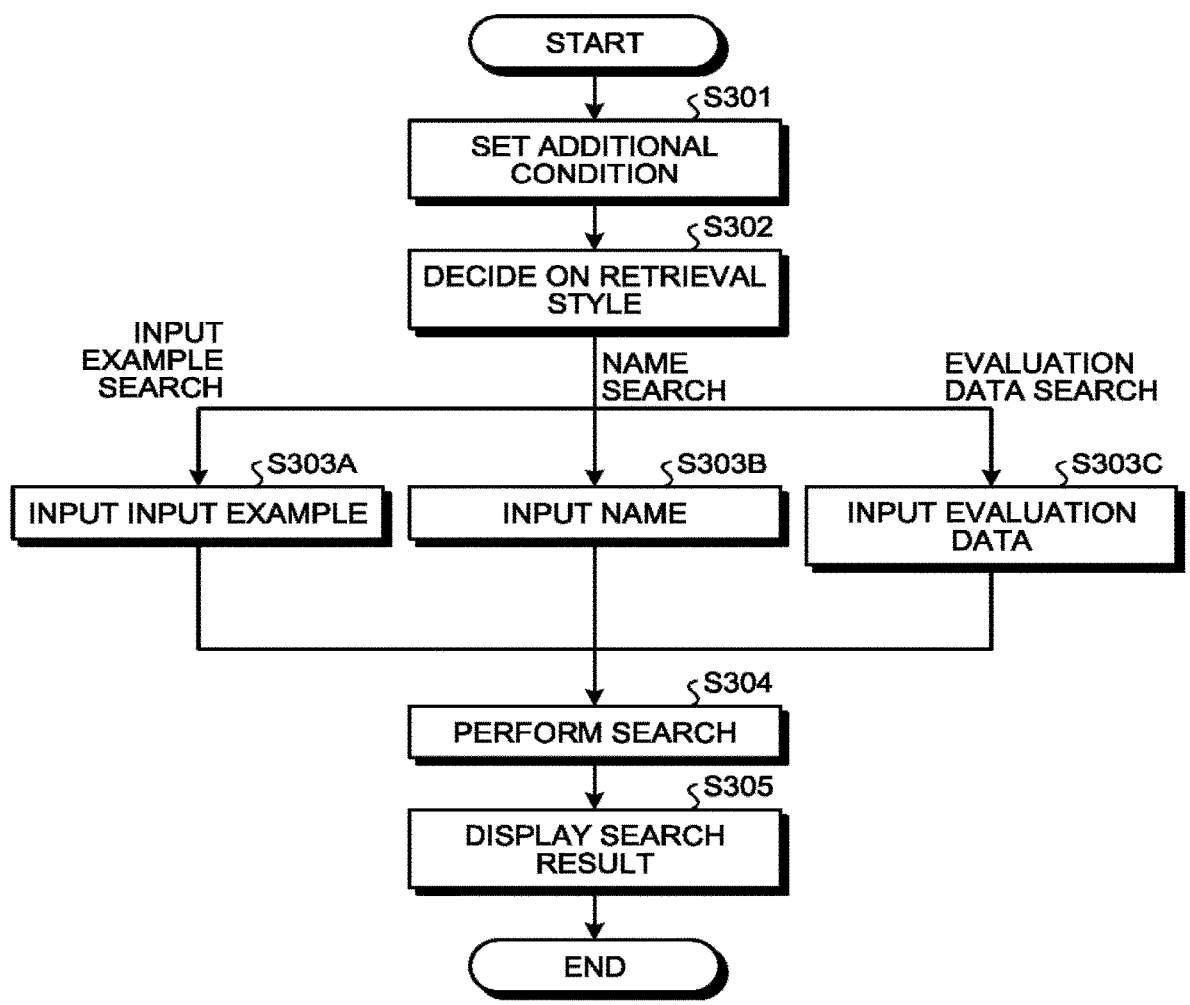
FIG. 16 is a flowchart for explaining an exemplary sequence of operations performed during a search operation.

FIG. 16 is a flowchart for explaining an exemplary sequence of operations performed during the search operation at Step S203 illustrated in FIG. 15. During the search operation, firstly, additional condition is set as may be necessary (Step S301). The additional condition represents a condition serving as a filter for the average evaluation, or the average processing time, or the usage fee; and indicates a condition such as searching for the components having the average evaluation equal to or higher than "3". Then, the component retrieval server 10 decides on the retrieval style according to the operations performed by the developer using the component usage UIs 50 (Step S302). As described earlier, examples of the retrieval style include an input example search in which searching is done with an input example, a name search in which searching is done with the name and the explanation of a component, and an evaluation data search in which evaluation data containing input and output is uploaded and searching is done with the accuracy calculated using the evaluation data.

Then, the component retrieval server 10 provides the component search UI 50A to the developer, and receives input corresponding to the retrieval style decided at Step S302 (Steps S303A, S303B, and S303C). That is, if an input example search is decided as the retrieval style, then the component retrieval server 10 receives input of a specific input example with respect to a component. If a name search is decided as the retrieval style, then the component retrieval server 10 receives input of the name and the explanation of a component. If an evaluation data search is decided as the retrieval style, then the component retrieval server 10 receives input of evaluation data containing input and output for evaluating the accuracy of a component. Then, the component retrieval server 10 searches for the components registered in the component catalog DB 33 (Step S304) and displays the sets of component information 52, which are obtained as a result of performing the search, as the search result in the component search UI 50A (Step S305).

Figure 17:
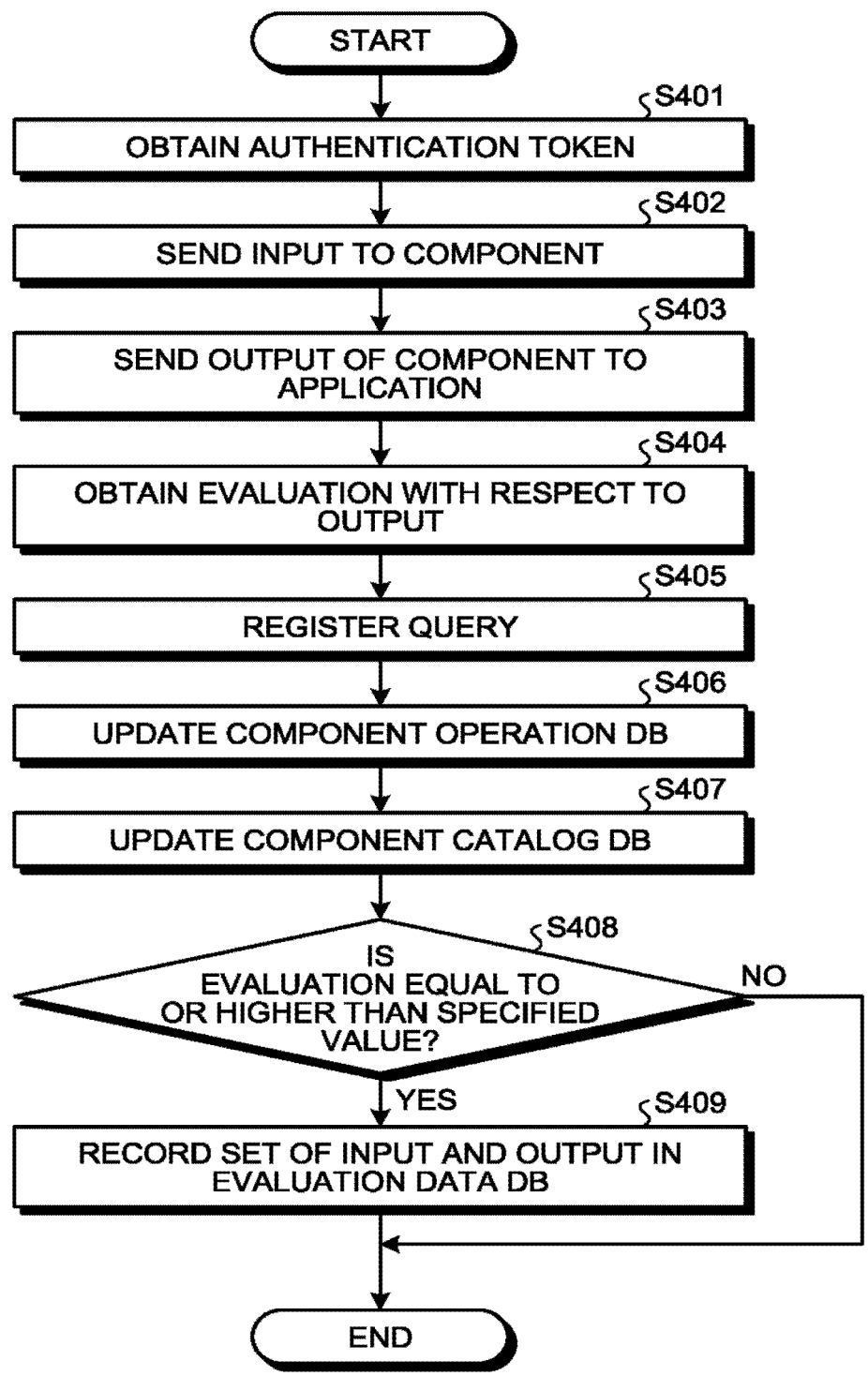
FIG. 17 is a flowchart for explaining an exemplary sequence of operations performed when an application uses a component.

FIG. 17 is a flowchart for explaining an exemplary sequence of operations performed when the application 70 uses a component. Prior to the execution of this sequence of operations; the developer needs to obtain the application ID, which enables identification of the application 70, using his or her own account information. Once the application ID is issued by the component management device, the application 70 is thereafter identified by that application ID.

The user of the application 70 firstly obtains an authentication token that is necessary for the application 70 to call components (Step S401). The application token can be obtained by sending the account information of the user and the application ID.

Then, the application 70 sends, to the component operation server 20 via an API provided by the component operation server 20, the authentication token, the component ID for specifying the destination component, and the input data. Based on the received component ID, the component operation server 20 obtains the endpoint information of the endpoint to which the input should be sent from the component catalog DB 33 (Step S402). Subsequently, the component operation server 20 receives the output of the component and sends it to the application 70 (Step S403).

After performing the processing using the output of the component, the application 70 sends the evaluation indicating whether or not the processing details were appropriate, that is, sends the evaluation with respect to the output of the component to the component operation server 20. Upon obtaining the evaluation with respect to the output of the component from the application 70 (Step S404), the component operation server 20 pairs the input-output and the evaluation of the component and registers that information in the query DB 35 (Step S405). Moreover, the component operation server 20 increments the corresponding query count in the component operation DB 34 (Step S406), and updates the average evaluation and the average processing time in the component catalog DB 33 (Step S407).

If the evaluation obtained from the application 70 at Step S404 is equal to or higher than a specified value (for example, "4") (Yes at Step S408), then the component operation server 20 records the input and the output of the component as the evaluation data in the evaluation data DB 32 (Step S409). At the time of recording the evaluation data in the evaluation data DB 32, it is possible to set restrictions based on the usage record, such as a restriction that the query from the application 70 is performed for a sufficient number of times. Moreover, as explicit evaluation data, the data set of input-output can be input to the component operation server 20 via an API. The evaluation data recorded in the evaluation data DB 32 is used in the evaluation at the time of performing component substitution (described later).

Figure 18:
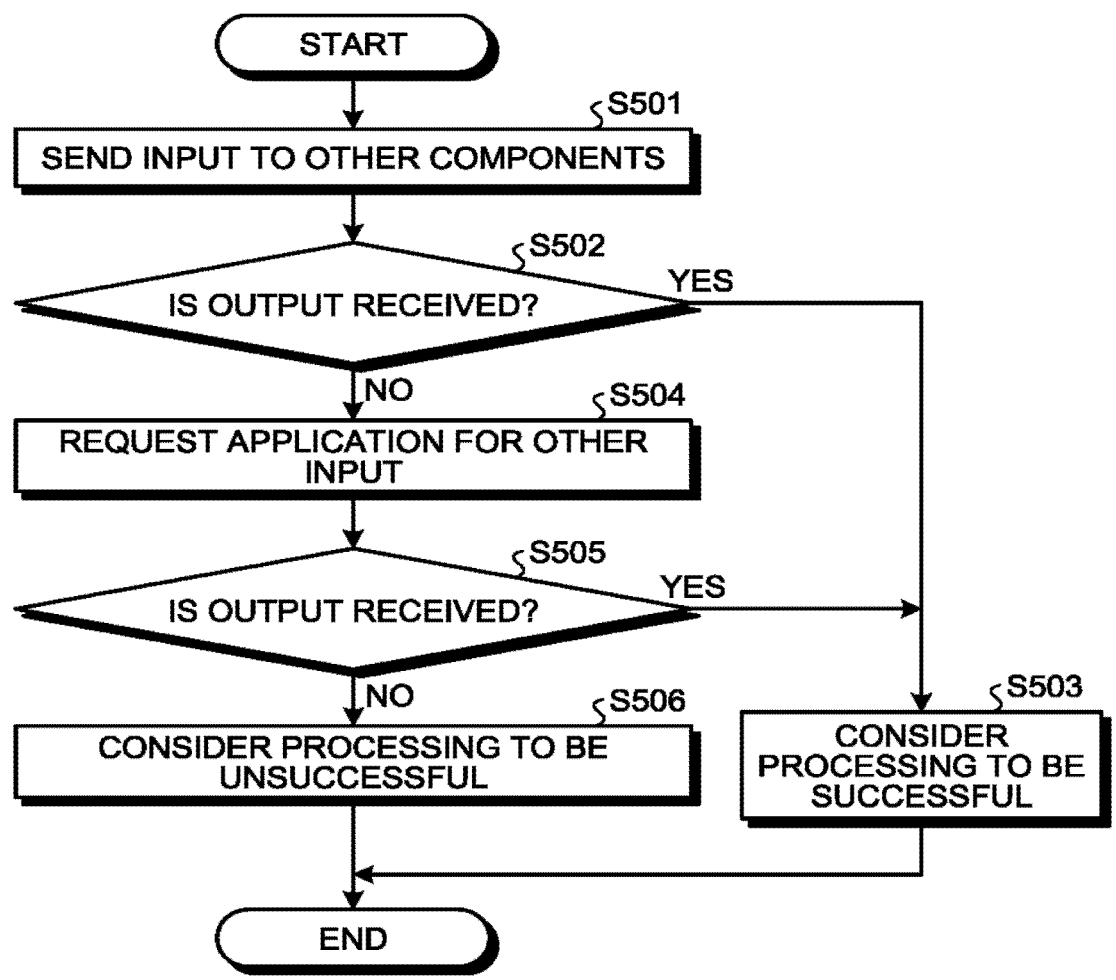
FIG. 18 is a flowchart for explaining an exemplary sequence of operations performed at the time of using a substitute component.

Meanwhile, if the component cannot make an output with respect to the input from the application 70, then the component operation server 20 can send the input from the application 70 to another component (a substitute component) that can respond in place of the concerned component. FIG. 18 is a flowchart for explaining an exemplary sequence of operations performed at the time of using a substitute component.

After sending the input from the application 70 to a component at Step S402 illustrated in FIG. 17, if the output from that component cannot be received, the component operation server 20 sends input data from the application 70 to other components of the same type (Step S501). As far as the other components are concerned, it is possible to think of a plurality of patterns such as a pattern in which the input data is sent to a plurality of components set in advance by the application 70, or a pattern in which the input data is sent to the component that is often substituted for the concerned component (i.e., to the substitution destination component in the component catalog DB 33).

If the output from the other component is received (Yes at Step S502), then the component operation server 20 sends the output of the other component to the application 70, and considers the processing to be successful (Step S503). However, if the output from the other component is not received (No at Step S502), then the component operation server 20 requests the application 70 for some other input representing a substitute for the previous input (Step S504). The other input representing a substitute for the previous input is assumed to be the following: in the case of dialogue processing, the input of the speech having a different expression; or in the case of image recognition, the input of images from a camera that took images of the same situation from a different angle.

Subsequently, the component operation server 20 sends the substitute input from the application 70 to the other component and, if the output from that component is received (Yes at Step S505), sends the output of that component to the application 70; and considers the processing to be successful (Step S503). However, if the output with respect to the substitute input is also not received from the other component (No at Step S505), then the component operation server 20 sends status information indicating failure in processing to the application 70, and considers the processing to be unsuccessful (Step S506). Moreover, if the response with respect to the substitute input, which is received from the application 70, is also not received from the other component; then the processing can be considered to be unsuccessful.

Figure 19:
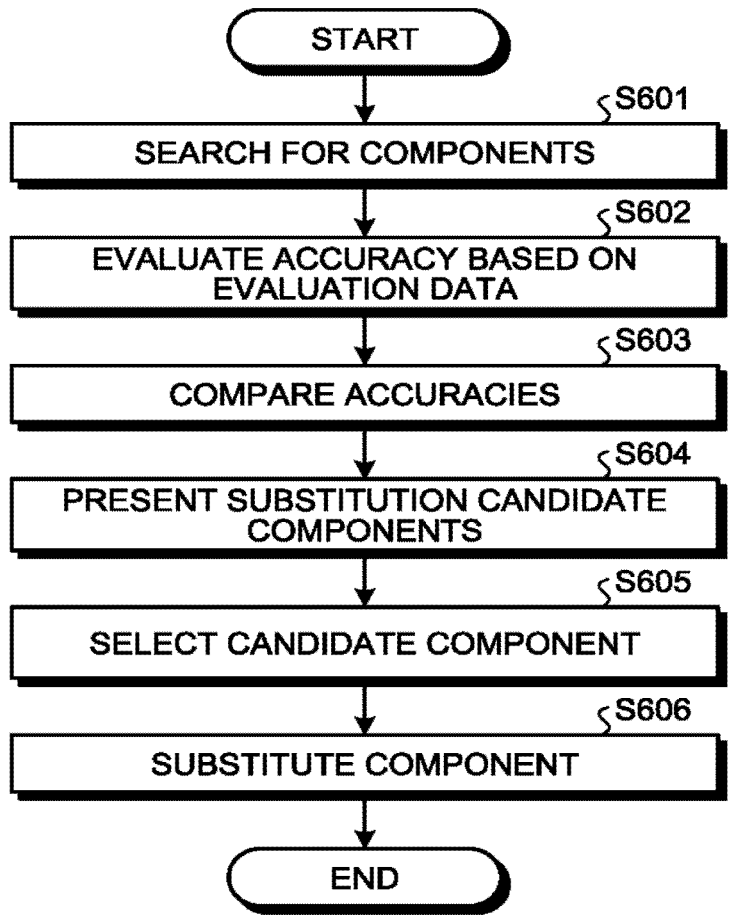
FIG. 19 is a flowchart for explaining an exemplary sequence of operations performed at the time of component substitution.

FIG. 19 is a flowchart for explaining an exemplary sequence of operations performed at the time of component substitution. Herein, component substitution implies the operation in which the component being used by the application 70 is substituted with another component that is newly added and that provides better performance. This operation is performed in a periodical manner, such as once a week.

Firstly, the component operation server 20 searches for the components of the same type as the component being used by the application 70 (Step S601). During the search, for example, it is possible to set restrictions, such as a restriction that only the components added after the previous component substitution operation are to be searched, or a restriction that only the components having the evaluation of equal to or higher than "4" are to be searched.

Then, the component operation server 20 refers to the evaluation data of the same component type stored in the evaluation data DB 32, and performs accuracy evaluation of the components searched at Step S601 as well as performs accuracy evaluation of the existing component being used by the application 70 (Step S602). In this accuracy evaluation, either all sets of evaluation data of the same component type stored in the evaluation data DB 32 can be used, or the evaluation data collected only from the target application 70 (i.e., past queries from the target application 70) can be used.

Subsequently, the component operation server 20 compares the accuracy of each component searched at Step S601 with the accuracy of the existing component being used by the application 70 (Step S603). Then, the component operation server 20 presents, as substitution candidate components to the developer, the components having the accuracy to be equal to or higher than a certain level with reference to the existing component (Step S604). At that time, the output of the substitution candidate components with respect to the input included in the evaluation data can be presented in comparison with the output of the existing component. Alternatively, the substitute candidate components can be selected not only based on the accuracy obtained using the evaluation data, but also from a different perspective such as based on the components having a shorter processing time than the existing component.

When the substitute candidate components are presented by the component operation server 20, the developer selects, as may be necessary, the component that, from among the substitute candidate components, is to be substituted for the existing component (Step S605); and then substitutes the existing component in the application 70 with the selected component (Step S606). When the developer selects a component at Step S605, the information of that component is reflected in the component catalog DB 33, and the component ID of the substituted component is stored as the substitute destination component of the existing component.

As described above in detail with reference to specific examples, in the component management device according to the embodiment, the component retrieval server 10 searches for the components that are registered in the DB server 30 and presents the search result; and the component operation server 20 supports the use (operations) of the components by the applications 70. Thus, the groups of components provided from many and unspecified sources can be appropriately managed to be usable by the applications 70, and the use (operations) of the components by the application 70 can be supported.

That is, as a result of using the component management device according to the embodiment, the developers of the applications 70 can search for and use the required components at low cost and can easily substitute the components with the components providing better performance. Moreover, the component developers can get their developed components used by a large number of the applications 70 and can obtain the usage fee. Furthermore, providing components that offer better performance enables expansion in a large number of applications.

The component management according to the embodiment can be implemented by collaborative functioning of hardware, which constitutes a general-purpose computer, and computer programs (software) executed in the computer. For example, when a computer executes a particular computer program, the functions of the component retrieval server 10 and the component operation server 20 can be implemented. Moreover, the functions of the DB server 30 can be implemented using the storage device for the computer.

Figure 20:
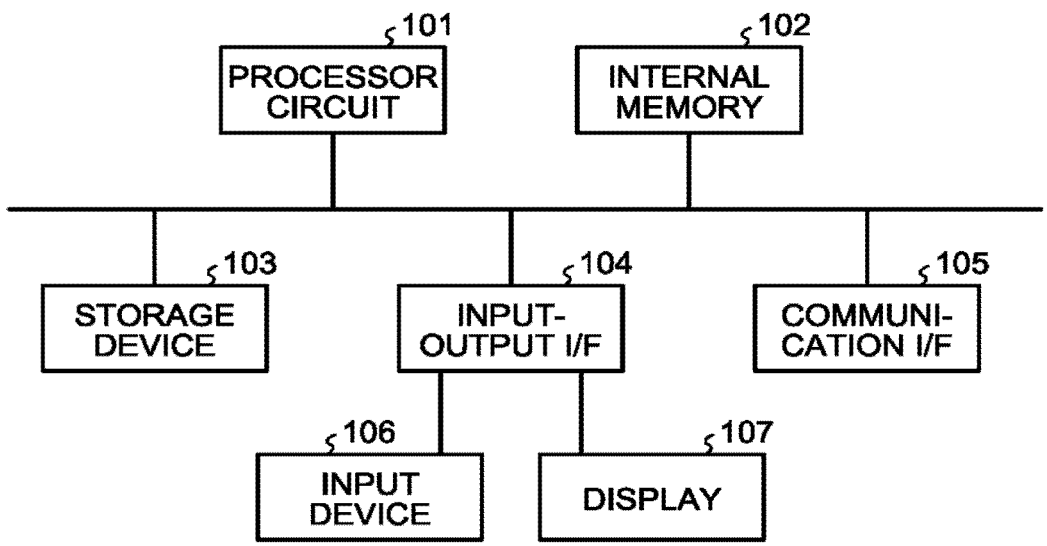
FIG. 20 is a block diagram illustrating an exemplary hardware configuration of the component management device.

FIG. 20 is a block diagram illustrating an exemplary hardware configuration of the component management device according to the embodiment. For example, as illustrated in FIG. 20, the component management device according to the embodiment has the hardware configuration of a general-purpose computer that includes a processor circuit 101 such as a central processing unit (CPU) or a graphics processing unit (GPU); an internal memory 102 such as a random access memory (RAM) or a read only memory (ROM); a storage device 103 such as a hard disk drive (HDD) or a solid state drive (SDD); an input-output I/F 104 for establishing connection to peripheral devices such as an input device 106 and a display 107; and a communication I/F 105 for communicating with external devices such as client-edge terminals that are used by developers and users. For example, the processor circuit 101 uses the internal memory 102, and executes a computer program stored in the storage device 103 or the internal memory 102, so that the functional constituent elements described above can be implemented.

In other words, the functional constituent elements of the component management device according to the embodiment are included in the computer program executed by the computer, and are generated in the main memory (the internal memory 102 illustrated in FIG. 20) such as a RAM when one or more processors (the processor circuit 101 illustrated in FIG. 20) of the computer execute the computer program.

The computer program executed by the computer is recorded in, for example, a magnetic disk (a flexible disk, a hard disk, or the like); or an optical disk (CD-ROM, a CD-R, a DVD-ROM, a DVD±R, a DVD±RW, a Blu-ray (registered trademark) disc, or the like); or a semiconductor memory; or a similar recording memory. As long as the recording medium in which the computer program is recorded is a computer-readable recording medium, any storage type can be used. Alternatively, the computer program can be installed in advance in the computer, or the computer program that is obtainable via a network can be installed in the computer.

Meanwhile, in the component management device according to the embodiment, some or all of the functional constituent elements can be implemented using dedicated hardware such as an application specific integrated circuit (ASIC) or a field-programmable gate array (FPGA). Moreover, the component management device according to the embodiment can be configured as a network system that is communicably connected to a plurality of computers, and the functional constituent elements can be implemented in a dispersed manner among the computers. Alternatively, the component management device according to the embodiment can be configured as a virtual machine running in the cloud.

Herein, although the present invention is described with reference to the abovementioned embodiments for a complete and clear disclosure, the appended claims are not to be thus limited but are to be construed as embodying all modifications and alternative constructions that may occur to one skilled in the art that fairly fall within the basic teaching herein set forth.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A component management device comprising:
a database in which components are registered, input-output of each component being defined for type of the component; and
one or more hardware processors configured to:
receive input of name, input example, or evaluation data of the component;
search for the component registered in the database, according to the input;
present a search result; and
send input from an application, which uses the searched component, to a component and send output of the component to the application, wherein
the one or more hardware processors are further configured to:
measure a period of time since transmission of the input from the application to the component until reception of the output from the component, calculate response performance of the component based on the measured period of time, and record the response performance in the database, and
present the response performance of the searched component.

2. The component management device according to claim 1, wherein the one or more hardware processors are further configured to calculate accuracy of the components, which are registered in the databases, using the received evaluation data, and present, as the search result, information of the components in a descending order of the calculated accuracy.

3. The component management device according to claim 1, wherein the one or more hardware processors are further configured to repeatedly receive the input and search for the component, and build an operation flow of the application in which a plurality of the components is combined.

4. The component management device according to claim 1, wherein the one or more hardware processors are further configured to present information which enables identification of another component being used along with the searched component by the application that uses the searched component.

5. The component management device according to claim 1, wherein the one or more hardware processors are further configured to present a tool for obtaining a software component that makes the searched component run in a specific environment.

6. The component management device according to claim 1, wherein the one or more hardware processors are further configured to record, in the database, a set of the input from the application and the output of the component.

7. The component management device according to claim 1, wherein the one or more hardware processors are further configured to receive, from the application, evaluation with respect to the output of the component and, if the evaluation is equal to or higher than a specified value, record, as the evaluation data in the database, a set of the input from the application and the output of the component.

8. The component management device according to claim 7, wherein the one or more hardware processors are further configured to use the evaluation data to calculate accuracy of the component used by the application and accuracy of another component of a same type as the component, and present information of the another component having a higher accuracy than the component used by the application.

9. The component management device according to claim 1, wherein
the one or more hardware processors are further configured to:
receive, from the application, evaluation with respect to the output of the component, calculate evaluation index of the component based on the evaluation, and record the evaluation index in the database, and
present the evaluation index of searched component.

10. The component management device according to claim 1, wherein, when the output is not obtained from the component to which the input from the application was sent, the one or more hardware processors are further configured to send the input from the application to another component of a same type as the component, and send output from the another component to the application.

11. The component management device according to claim 1, wherein, when the output is not obtained from the component to which the input from the application was sent, the one or more hardware processors are further configured to request the application for another input.

12. The component management device according to claim 1, wherein the one or more hardware processors are further configured to record, in the database, usage count of the component by the application.

13. A component management method, implemented by a computer, the method comprising:
registering, in a database, components with input-output of each component being defined on a type-by-type basis;
searching that includes
receiving input of name, input example, or evaluation data of the component,
searching for the component registered in the database, according to the input, and
presenting a search result; and
sending that includes sending input from an application, which uses the searched component, to a component and sending output of the component to the application, wherein
the method further comprises:
measuring a period of time since transmission of the input from the application to the component until reception of the output from the component, calculating response performance of the component based on the measured period of time, and recording the response performance in the database, and
presenting the response performance of the searched component.

14. A computer program product having a non-transitory computer readable medium including programmed instructions, wherein the instructions, when executed by a computer, cause the computer to implement:
a registering function that includes registering, in a database, components with input-output of each component being defined on a type-by-type basis;
a searching function that includes
receiving input of name, input example, or evaluation data of the component,
searching for the component registered in the database, according to the input, and
presenting a search result; and a sending function that includes sending input from an application, which uses the searched component, to a component and sending output of the component to the application, wherein the instructions cause the computer to further implement:
measuring a period of time since transmission of the input from the application to the component until reception of the output from the component, calculating response performance of the component based on the measured period of time, and recording the response performance in the database, and presenting the response performance of the searched component.

* * * * *